US012602757B2

(12) United States Patent　　　　　　(10) Patent No.: US 12,602,757 B2

Eriksson　　　　　　　　　　　　　　　(45) Date of Patent: Apr. 14, 2026

(54) SYSTEM AND COMPUTER-IMPLEMENTED METHOD FOR IMAGE DATA QUALITY ASSURANCE IN AN INSTALLATION ARRANGED TO PERFORM ANIMAL-RELATED ACTIONS, COMPUTER PROGRAM AND NON-VOLATILE DATA CARRIER

(71) Applicant: DELAVAL HOLDING AB, Tumba (SE)

(72) Inventor: Andreas Eriksson, Tumba (SE)

(73) Assignee: DeLaval Holding AB, Tumba (SE)

( * ) Notice: Subject to any disclaimer, the term of this patent is extended or adjusted under 35 U.S.C. 154(b) by 433 days.

(21) Appl. No.: 18/010,177

(22) PCT Filed: Jun. 18, 2021

(86) PCT No.: PCT/SE2021/050602

§ 371 (c)(1),
(2) Date: Dec. 13, 2022

(87) PCT Pub. No.: WO2022/005365

PCT Pub. Date: Jan. 6, 2022

(65) Prior Publication Data

US 2023/0252615 A1　　Aug. 10, 2023

(30) Foreign Application Priority Data

Jun. 29, 2020　(SE) ..................................... 2050789-3

(51) Int. Cl.
*G06T 7/00*　　　　(2017.01)
*A01J 5/007*　　　　(2006.01)
(Continued)

(52) U.S. Cl.
CPC .............. *G06T 7/0002* (2013.01); *G06T 7/20* (2013.01); *G06T 7/70* (2017.01); *G06V 10/752* (2022.01);
(Continued)

(58) Field of Classification Search
None
See application file for complete search history.

(56) References Cited

U.S. PATENT DOCUMENTS

2001/0041825 A1* 11/2001 Shibata .............. A61B 1/00059
　　　　　　　　　　　　　　　　　　　600/118
2005/0104997 A1* 5/2005 Nonaka ................ H04N 23/811
　　　　　　　　　　　　　　　　　　　348/360
(Continued)

FOREIGN PATENT DOCUMENTS

WO　　2010/031632　　3/2010
WO　　2013/081544　　6/2013
(Continued)

OTHER PUBLICATIONS

International Search Report dated Sep. 13, 2021, for PCT/SE2021/050602, 4 pp.
(Continued)

*Primary Examiner* — Kaitlin A Retallick
(74) *Attorney, Agent, or Firm* — NIXON & VANDERHYE

(57) ABSTRACT

An imaging system registers image data ($D_{img}$) in connection with an installation performing at least one action relating to an animal. A system for image data quality assurance contains a control unit and a digital storage unit. The control unit obtains image data ($D_{img}$) registered by the imaging system when the installation is in an idle mode. The control unit analyzes the obtained image data ($D_{img}$) to determine if a cleaning action to remove dirt (D) from a front
(Continued)

window of the imaging system has been performed. If it is determined that such a cleaning action has been performed, control unit (120) causes a point in time for the cleaning action to be recorded in the digital storage unit (130) for use performance tracking of the installation in conjunction with the cleaning actions.

17 Claims, 2 Drawing Sheets

(51) Int. Cl.
| | |
|---|---|
| *G06T 7/20* | (2017.01) |
| *G06T 7/70* | (2017.01) |
| *G06V 10/75* | (2022.01) |
| *H04N 17/00* | (2006.01) |

(52) U.S. Cl.
CPC ............ *H04N 17/002* (2013.01); *A01J 5/007* (2013.01); *G06T 2207/30168* (2013.01); *G06T 2207/30188* (2013.01); *G06T 2207/30232* (2013.01)

(56) References Cited

U.S. PATENT DOCUMENTS

| | | | |
|---|---|---|---|
| 2012/0075464 A1 | 3/2012 | Derenne et al. | |
| 2013/0340682 A1* | 12/2013 | Bareket | A01J 5/017 |
| | | | 119/14.08 |
| 2014/0318581 A1 | 10/2014 | Axelsson et al. | |
| 2015/0217338 A1 | 8/2015 | De Luca et al. | |
| 2019/0089904 A1* | 3/2019 | Liu | G03B 41/00 |
| 2021/0304420 A1* | 9/2021 | Krunic | G06T 7/12 |

FOREIGN PATENT DOCUMENTS

| | | | | |
|---|---|---|---|---|
| WO | WO-2013081544 A1 * | 6/2013 | ............ | A01K 1/126 |
| WO | 2017/155457 | 9/2017 | | |
| WO | WO-2017155457 A1 * | 9/2017 | ............ | A01J 5/007 |

OTHER PUBLICATIONS

Written Opinion of the ISA dated Sep. 13, 2021, for PCT/SE2021/050602, 7 pp.
Swedish Search Report dated Feb. 26, 2021, for SE Application No. 2050789-3, 2 pp.
Nathanael Rota et al., "Video Sequence Interpretation for Visual Surveillance", in Proc. of the 3d IEEE Int'l Workshop on Visual Surveillance, Dublin, Ireland, section 4. "Contextual Information", section 5.3. "Scenario recognition", Jul. 1, 2000, pp. 59-67.

* cited by examiner

SYSTEM AND COMPUTER-IMPLEMENTED METHOD FOR IMAGE DATA QUALITY ASSURANCE IN AN INSTALLATION ARRANGED TO PERFORM ANIMAL-RELATED ACTIONS, COMPUTER PROGRAM AND NON-VOLATILE DATA CARRIER

CROSS-REFERENCE TO RELATED APPLICATION(S)

This application is the U.S. national phase of International Application No. PCT/SE2021/050602 filed Jun. 18, 2021, which designated the U.S. and claims priority to SE 2050789-3 filed Jun. 29, 2020, the entire contents of each of which are hereby incorporated by reference.

TECHNICAL FIELD

The present invention relates generally to image processing in arrangements for performing actions in relation to animals, such as milking installations. Especially, the invention relates to a system for image data quality assurance in an installation arranged to perform at least one action in relation to an animal and a computer-implemented method for such a system. The invention also relates to a corresponding computer program and a nonvolatile data carrier storing such a computer program.

BACKGROUND

Today's automatic milking arrangements and other farm management installations are highly complex installations in which the degree of human interaction is relatively low. It is therefore important that these arrangements can operate reliably in an essentially autonomous manner. Many of the systems devised to control the arrangements rely heavily on image registering. As always when animals are involved a degree of dirtiness is unavoidable. This means that the lenses of the image registering equipment used may become obstructed by dirt, or at least suffer from degraded performance due to dirt particles accumulating thereon.

WO 2010/031632 describes arrangements and methods for testing a camera that is arranged in an automated milking system. A camera test arrangement for determining the performance of a camera used in an automated milking system. The camera test arrangement contains a camera test device with means for providing a repeatable test environment for the camera. The camera test arrangement also contains image processing means for processing data obtained from the camera when arranged in the camera test device and for determining the performance of the camera.

The above test arrangement may be a useful tool for deciding whether the front lens of the camera should be cleaned. However, both performing the testing and carrying out the cleaning takes time, and the time needed may not always be available. For example, in a rotary milking parlor, it is seldom possible to carry out any automatic cleaning of the camera during operation, because the time window between the milking of two consecutive animals is too short. Therefore, at best, the automatic cleaning is carried out between each milking session, i.e. after that all the animals on the rotating platform have been milked. This may prove to be too seldom. In particular, if the platform is large and/or the facility is comparatively dirty, the milking robot may have difficulties completing its tasks due to poor quality of the registered image data.

SUMMARY

The object of the present invention is therefore to offer a solution that mitigates the above problems and encourages alternative means of cleaning the image registering means in installations arranged to perform animal-related actions.

According to one aspect of the invention, the object is achieved by a system for image data quality assurance in an installation arranged to perform at least one action in relation to an animal. The system contains a control unit and a digital storage unit. The control unit is configured to obtain image data registered by an imaging system of the installation when the installation is in an idle mode, for example between milkings of two different animals. The control unit is configured to analyze the obtained image data and determine if a cleaning action is performed aiming to remove dirt from a front window of the imaging system. If it is determined that such a cleaning action is performed, the control unit is further configured to cause a point in time for the cleaning action to be recorded in the digital storage unit.

The above system is advantageous because it automatically keeps track of all kinds of camera cleaning actions, i.e. manual ones as well as the ones performed automatically. Thereby, the farmer can acquire overall knowledge about the interrelationships between the cleaning instances and the performance of the installation. This, in turn, is expected to help the farmer to understand what is an appropriate cleaning frequency, and when it is suitable to perform any manual cleaning.

Preferably, it is presumed that the cleaning action is performed manually outside of a schedule for automatic cleaning of the front window of the imaging system, or that the cleaning is performed only manually.

According to embodiments of this aspect of the invention, the control unit is configured to determine that the cleaning action is performed based on whether the registered image data is estimated to represent a first, second, third and/or fourth object. Specifically, it may be checked if the first object covers at least a predefined portion of a total image area registrable by the imaging system through the front window, which first object moves and/or is positioned relative to the front window in a way deemed to cause dirt to be removed therefrom. It may further be checked if the second object is located within a distance range from the front window, which second object moves and/or is positioned relative to the front window in a way deemed to cause dirt to be removed therefrom. Moreover, it may be checked if image data designates an intensity of light which is estimated to be reflected from the third object that moves and/or is positioned relative to the front window in a way deemed to cause dirt to be removed therefrom. It may also be checked if the fourth object has a shape that matches an outline of a predefined cleaning tool to a degree above a threshold matching level, which fourth object moves and/or is positioned relative to the front window in a way deemed to cause dirt to be removed therefrom. Consequently, a wide range of manual cleaning activities can be detected.

According to another embodiment of this aspect of the invention, the control unit is configured to determine that the cleaning action is performed on the further basis of a confidence measure indicating a reliability of the image data. Thus, the control unit may weigh in a reliability factor in the analysis of the image data.

According to yet another embodiment of this aspect of the invention, the control unit is configured to analyze the obtained image data by executing an image processing algorithm adapted to detect an amount of dirt on the front window, and based thereon, draw conclusions about whether a cleaning action has been performed.

According to still another embodiment of this aspect of the invention, the control unit is configured to execute the image processing algorithm at first and second points in time. The second point in time is here later than the first point in time; and if the image processing algorithm detects that the amount of dirt on the front window is lower at the second point in time than at the first point in time, the control unit is further configured to cause the second point in time to be recorded in the digital storage unit as a point in time when the cleaning action was performed. Thus, cleaning actions can be detected indirectly in a straightforward manner.

According to another embodiment of this aspect of the invention, the control unit is further configured to determine that the cleaning action is performed based on a duration of a period during which at least one of the first, second, third and fourth objects is located within a view range of the imaging system. In other words, if one or more of said objects have been located at the front window during the time of a typical cleaning, it may be concluded that a cleaning action was performed.

According to yet another embodiment of this aspect of the invention, the control unit is configured to obtain a series of recorded points in time for the cleaning action from the digital storage unit; and generate a report based on said series of recorded points in time. The report describes cleaning activity performed to remove dirt from the front window of the imaging system. The report thus assists the farmer in acquiring an overall knowledge about the interrelationships between the cleaning instances and the performance of the installation.

Preferably, for easy access to the report, the control unit is further configured to forward the report to a display unit for presentation of the report together with information reflecting a performance of said installation.

According to still another embodiment of this aspect of the invention, the above-mentioned performance may reflect a number of animals served by the installation per unit of time during at least one period in relation to at least one point in time in the series of recorded points in time. This increases the farmer's chances of identifying interrelationships between the cleaning actions and the performance of the installation.

According to another aspect of the invention, the object is achieved by a computer-implemented method of quality assuring image data in an installation arranged to perform at least one action in relation to an animal. The method involves: obtaining image data having been registered by an imaging system of said installation when the installation is in an idle mode; analyzing the obtained image data to determine if a cleaning action is performed aiming to remove dirt from a front window of the imaging system. If it is determined that such a cleaning action is performed, the method further involves causing a point in time for the cleaning action to be recorded in a digital storage unit. The advantages of this method, as well as the preferred embodiments thereof, are apparent from the discussion above with reference to the system.

According to a further aspect of the invention, the object is achieved by a computer program loadable into a non-volatile data carrier communicatively connected to a processing unit. The computer program includes software for executing the above method when the program is run on the processing unit.

According to another aspect of the invention, the object is achieved by a non-volatile data carrier containing the above computer program.

Further advantages, beneficial features and applications of the present invention will be apparent from the following description and the dependent claims.

BRIEF DESCRIPTION OF THE DRAWINGS

The invention is now to be explained more closely by means of preferred embodiments, which are disclosed as examples, and with reference to the attached drawings.

DETAILED DESCRIPTION

Figure 1:
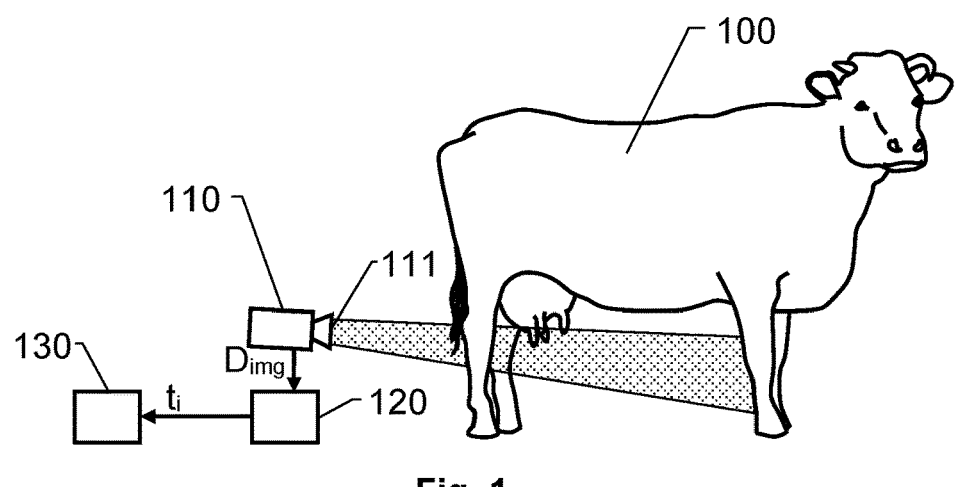
FIG. 1 illustrates how an imaging system registers image data in a type of installation in which the invention may be employed.

In FIG. 1, we see how an imaging system 110 registers image data $D_{img}$ in an installation arranged to perform at least one action in relation to an animal 100, for example milking the animal 100 using a milking robot, cleaning the animal's 100 teats before milking, treating the animal's 100 teats after milking, feeding the animal 100 or allowing the animal 100 to pass through an automatic gate. Of course, this listing of animal-related actions is non-exhaustive.

The imaging system 110 is configured to forward the image data $D_{img}$ to a control unit 120, which is further communicatively connected to a digital storage unit 130. Here, the control unit 120 and the storage unit 130 form part of a system for image data quality assurance according to one embodiment of the invention.

The control unit 120 is configured to obtain the image data $D_{img}$ registered by the imaging system 110 of the installation when the installation is in an idle mode, i.e. when the imaging system 110 is not engaged in registering image data $D_{img}$ to be used for monitoring and/or controlling a device in the installation, such as a milking robot.

The control unit 120 is configured to analyze the obtained image data $D_{img}$ to determine if a cleaning action is performed, which cleaning action aims at removing dirt D from a front window 111 of the imaging system 110. By front window 111 is preferably meant a protective glass for the imaging system's 110 lens arrangement. However, in the absence of such a protective glass, the frontmost lens of the lens arrangement itself designates the front window 111. If it is determined that said cleaning action is performed, the control unit 120 is configured to cause a point in time $t_i$ for the cleaning action to be recorded in the digital storage unit 130.

Although the detected cleaning action may be carried out automatically as part of a programmed, or predefined, cleaning routine for the imaging system 110, it is preferably presumed that the detected cleaning action is performed manually outside of a schedule for automatic cleaning of the front window 111. For example, the detected cleaning action may instead be carried out by an operator who is swiping off the surface with a piece of cloth, a squeegee or similar tool.

Figure 2:
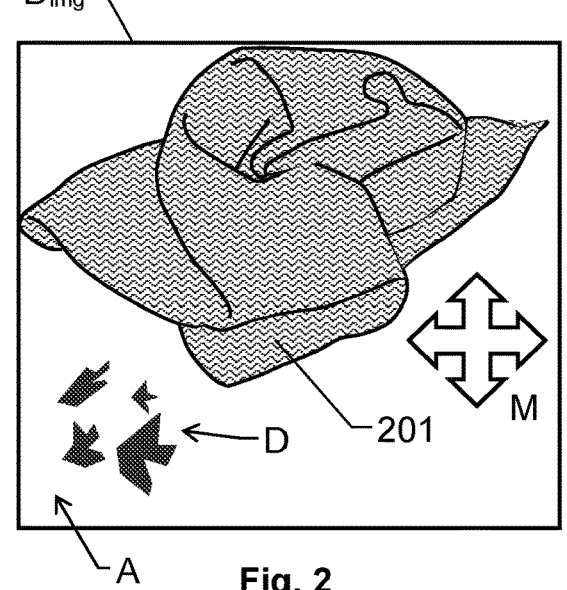
FIGS. 2-4 show examples of objects and actions that may be used to perform cleaning actions according to embodiments the invention.

FIG. 2 shows an example, where a first object 201 that may be used to perform a cleaning action aiming at removing dirt D from the front window 111 of the imaging system 110. According to one embodiment of the invention, the control unit 120 is configured to determine that the cleaning action is performed based on image data $D_{img}$ estimated to represent the first object 201 covering at least a predefined portion of a total image area A being registrable by the imaging system 110 through the front window 111. The area of the first object 201 typically represents around 10% to 100% of the total area A, and preferably represents around 50% to 100% of the total area A. To qualify as an object performing said cleaning action, the first object 201 shall also move M and/or be positioned relative to the front window 111 in a way that is deemed to cause dirt D to be removed from the front window 111 of the imaging system 110, for example in a manner typical for how a human operator would handle a piece of cloth, or similar cleaning tool, in order to swipe off the surface of the front window 111.

Figure 3:
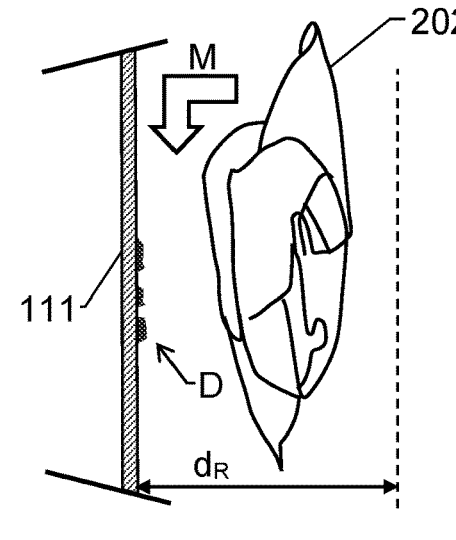
Figure 3:

FIG. 3 shows an example of a second object 202 that is used to perform a cleaning action aiming at removing dirt D from the front window 111 of the imaging system 110. According to one embodiment of the invention, the control unit 120 is configured to determine that the cleaning action is performed based on image data $D_{img}$ estimated to represent the second object 202 being located within a distance range $d_R$ from the front window 111. The distance range $d_R$ is around 0 cm to 30 cm, and preferably around 0 cm to 10 cm. To qualify as an object performing said cleaning action, the second object 201 shall also move M and/or be positioned relative to the front window 111 in a way deemed to cause dirt D to be removed from the front window 111 of the imaging system 110, for example in a manner typical for how a human operator would handle a piece of cloth, or similar cleaning tool, in order to swipe off the surface of the front window 111.

As yet another example (not illustrated), a third object that may be used to perform a cleaning action aiming at removing dirt D from the front window 111 of the imaging system 110. According to one embodiment of the invention, the control unit 120 is configured to determine that the cleaning action is performed based on image data $D_{img}$ designating an intensity of light which is estimated to be reflected from the third object that, regardless of its shape and distance to the front window 111, moves M and/or is positioned relative to the front window 111 in such a way that it is deemed to cause dirt D to be removed from the front window 111. Thus, the third object that may any kind of object suitable for cleaning the front window 111.

Figure 4:
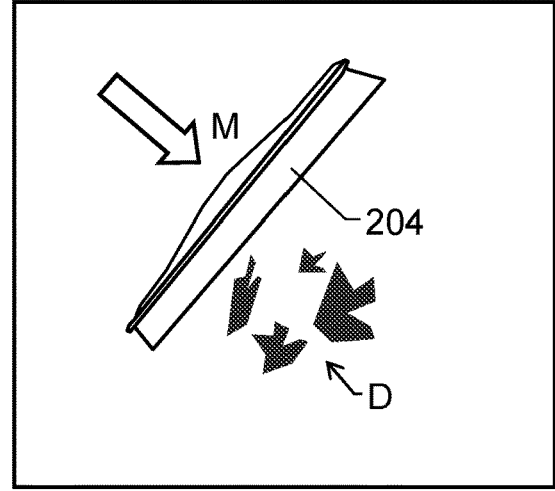

FIG. 4 shows an example of a fourth object 204 that may be used to perform a cleaning action aiming at removing dirt D from the front window 111 of the imaging system 110. According to one embodiment of the invention, the control unit 120 is configured to determine that the cleaning action is performed based on image data $D_{img}$ estimated to represent the fourth object 204 having a shape that matches an outline of a predefined cleaning tool to a degree above a threshold matching level. Said shape may thus represent a squeegee, a sponge, a cleaning cloth etc. To qualify as an object performing said cleaning action, the fourth object 201 shall also move M and/or be positioned relative to the front window 111 in a way that is deemed to cause dirt D to be removed from the front window 111 of the imaging system 110, for example in a manner typical for how a human operator would handle a cleaning tool, in order to swipe off the surface of the front window 111.

Further, the control unit 120 may be configured to determine that the cleaning action is performed based on a duration of a period during which at least one of the first, second, third and/or fourth objects is located within a view range of the imaging system 110.

According to one embodiment of the invention, the control unit 120 is configured to determine that the cleaning action is performed based on a confidence measure indicating a reliability of the image data $D_{img}$. The confidence measure may be represented by one or more data bits associated to image data $D_{img}$, for example to each pixel thereof, which designates how reliable said image data $D_{img}$ is. Thus, the control unit 120 may weigh in a reliability factor in the analysis of the image data $D_{img}$, and consequently rely on this data in proportion to its information value.

According to one embodiment of the invention, the control unit 120 is configured to analyze the obtained image data $D_{img}$ by executing an image processing algorithm, which is adapted to detect an amount of dirt on the front window 111. The image processing algorithm may for example be configured to recognize how particles of dirt D occur on the front window 111.

Preferably, the control unit 120 is further configured to execute the image processing algorithm at first and second points in time, where the second point in time is later than the first point in time. If the image processing algorithm detects that the amount of dirt D on the front window 111 is lower at the second point in time than at the first point in time, it is reasonable that a cleaning action has been performed sometime in between the first and second points in time. Of course, however, it cannot be deduced exactly when. Therefore, if the image processing algorithm detects that the amount of dirt D on the front window 111 is lower at the second point in time than at the first point in time, the control unit 120 is configured to cause the second point in time to be recorded in the digital storage unit 130 as a point in time when the cleaning action was performed.

Figure 5:
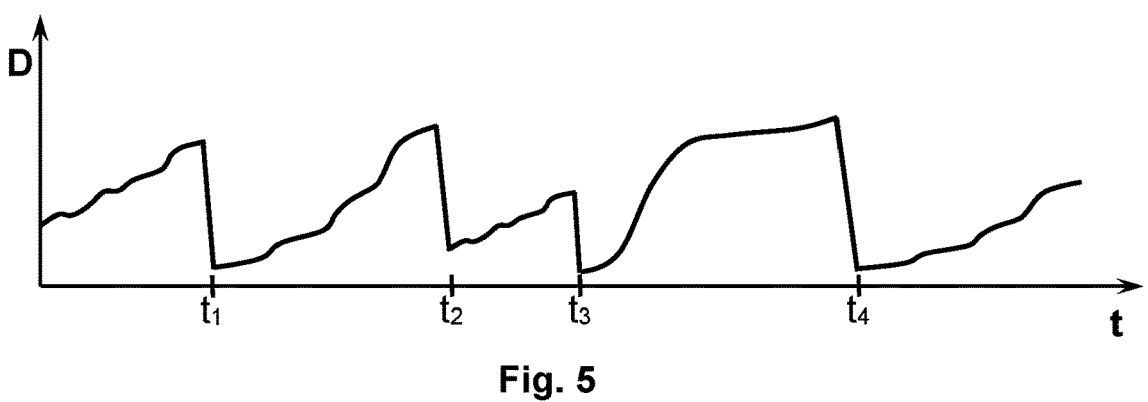
FIG. 5 shows a diagram exemplifying how an amount of dirt on the front window of the imaging system may vary over time depending on when cleaning actions are performed.

FIG. 5 shows a diagram exemplifying how an amount of dirt D on the front window 111 of the imaging system 110 may vary over time t depending on when various cleaning actions are performed. The vertical axis of the diagram reflects the amount of dirt D and the horizontal axis indicates time t. Here, we assume that cleaning actions are detected according the above-described embodiments of the invention at points in time $t_1$, $t_2$, $t_3$, and $t_4$. As is apparent from the graph, the amount of dirt D on the front window 111 of the imaging system 110 decreases drastically for each cleaning action. However, at no single event, the dirt D is completely removed. This is typically true irrespective of whether the cleaning action is carried out manually or automatically, for example by a machine submerging the imaging system 110 in a cleaning bath and/or subjecting the imaging system 110 to high-pressure jets of cleaning liquid.

Figure 6:
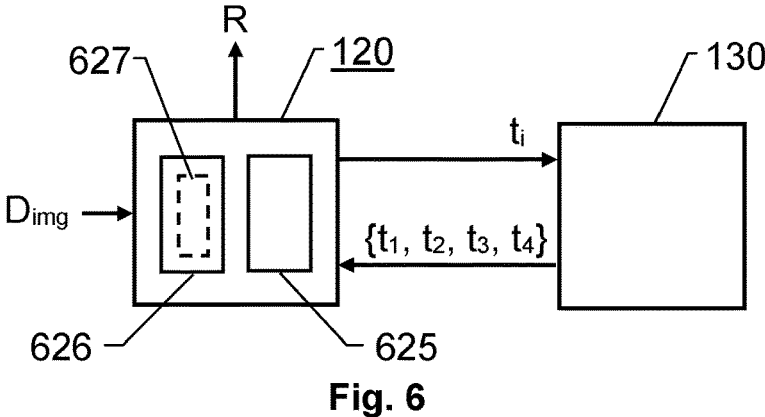
FIG. 6 shows a block diagram over a control unit and a storage unit according to one embodiment the invention.

FIG. 6 shows a block diagram over the control unit 120 and the storage unit 130 according to one embodiment the invention. As mentioned above, the control unit 120 is configured to cause the points in time $t_1$, $t_2$, $t_3$ and $t_4$ for each detected cleaning action to be recorded in the digital storage unit 130.

According to one embodiment of the invention, the control unit 120 is also configured to obtain, from the digital storage unit 130, a series of recorded points in time, for example $\{t_1, t_2, t_3, t_4\}$ for the cleaning actions, and generate a report R based on the series of recorded points in time $\{t_1,$ $t_2, t_3, t_4$}. The report R describes the cleaning activity having been performed to remove dirt D from the front window 111 of the imaging system 110, and thus maintain a reasonably clear view for the imaging system 110 over a period of time.

Preferably, the control unit 120 is further configured to forward the report R to a display unit (not shown) for presentation of the report R together with information reflecting a performance of the installation in which the imaging system 110 is included. For instance, the performance may reflect a number of animals 100 served by the installation per unit of time during at least one period in relation to at least one point in time in said series of recorded points in time {$t_1, t_2, t_3, t_4$}. This means that, the report R may for example describe the performance before and after a point in time $t_2$ when a cleaning action was detected. Thus, the farmer can readily determine the effects of his/her efforts to keep the front window 111 clean in addition to any automatic cleaning procedures applied for the same purpose.

It is generally advantageous if the control unit 120 is configured to effect the above-described procedure in an automatic manner by executing a computer program 627. Therefore, the control unit 120 may include a memory unit 625, i.e. non-volatile data carrier, storing the computer program 627, which, in turn, contains software for making processing circuitry in the form of at least one processor 623 in the control unit 120 execute the above-described actions when the computer program 627 is run on the at least one processor 623.

Figure 7:
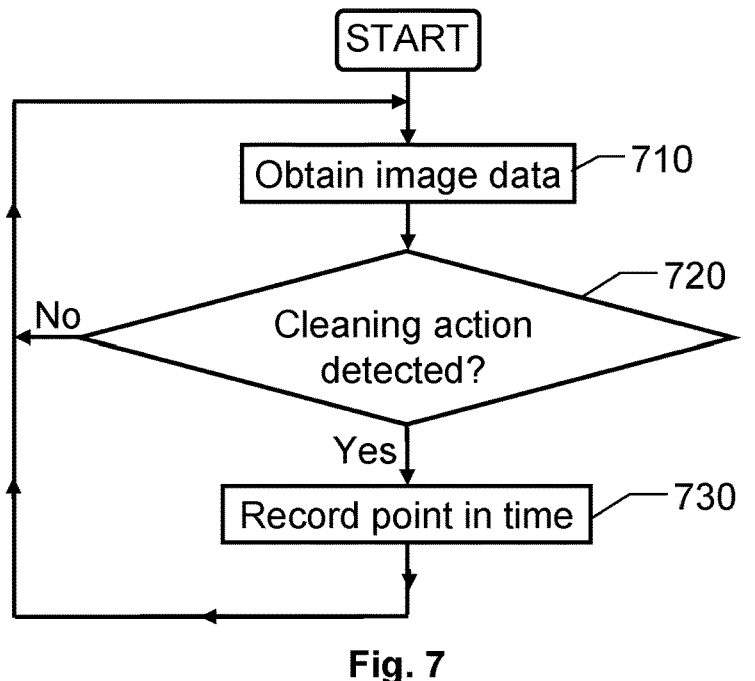
FIG. 7 illustrates, by means of a flow diagram, the general method according to the invention.

In order to sum up, and with reference to the flow diagram in FIG. 7, we will now describe the general computer-implemented method according to the invention of quality assuring image data in an installation arranged to perform at least one action in relation to an animal 100.

In a first step 710, image data $D_{img}$ are obtained, which image data $D_{img}$ have been registered by an imaging system 110 of the installation when the installation is in an idle mode.

In a subsequent step 720, the obtained image data $D_{img}$ are analyzed to determine if a cleaning action is performed aiming to remove dirt D from a front window 111 of the imaging system 110. If it is determined that such a cleaning action is performed, a step 730 follows. Otherwise, the procedure loops back to step 710. In step 730, a point in time $t_i$ for the cleaning action is recorded in a digital storage unit. Thereafter, the procedure loops back.

All of the process steps, as well as any sub-sequence of steps, described with reference to FIG. 7 may be controlled by means of a programmed processor. Moreover, although the embodiments of the invention described above with reference to the drawings comprise processor and processes performed in at least one processor, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the process according to the invention. The program may either be a part of an operating system, or be a separate application. The carrier may be any entity or device capable of carrying the program. For example, the carrier may comprise a storage medium, such as a Flash memory, a ROM (Read Only Memory), for example a DVD (Digital Video/Versatile Disk), a CD (Compact Disc) or a semiconductor ROM, an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal which may be conveyed via electrical or optical cable or by radio or by other means. When the program is embodied in a signal, which may be conveyed, directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

Variations to the disclosed embodiments can be understood and effected by those skilled in the art in practicing the claimed invention, from a study of the drawings, the disclosure, and the appended claims.

The term "comprises/comprising" when used in this specification is taken to specify the presence of stated features, integers, steps or components. The term does not preclude the presence or addition of one or more additional elements, features, integers, steps or components or groups thereof. The indefinite article "a" or "an" does not exclude a plurality. In the claims, the word "or" is not to be interpreted as an exclusive or (sometimes referred to as "XOR"). On the contrary, expressions such as "A or B" covers all the cases "A and not B", "B and not A" and "A and B", unless otherwise indicated. The mere fact that certain measures are recited in mutually different dependent claims does not indicate that a combination of these measures cannot be used to advantage. Any reference signs in the claims should not be construed as limiting the scope.

It is also to be noted that features from the various embodiments described herein may freely be combined, unless it is explicitly stated that such a combination would be unsuitable.

The invention is not restricted to the described embodiments in the figures, but may be varied freely within the scope of the claims.

The invention claimed is:

1. A system for image data quality assurance of an installation arranged to perform at least one action relating to an animal (100), the system comprising:

a control unit (120) and a digital storage unit (130) communicatively connected to the control unit (120), the control unit (120) being configured to:

automatically clean a front window of an imaging system on a schedule;

obtain image data ($D_{img}$) registered by the imaging system (110) of the installation when the installation is in an idle mode;

analyze the obtained image data ($D_{img}$) to determine if a cleaning action to remove dirt (D) from the front window (111) of the imaging system (110) has been performed manually, outside of the automatic cleanings on the schedule; and if it is determined that the cleaning action has been performed manually, cause a point in time ($t_i, t_1, t_2, t_3, t_4$) for the manual cleaning action to be recorded in the digital storage unit (130), wherein the control unit (120) is configured to determine that the cleaning action is performed based on at least one of:

image data ($D_{img}$) estimated to represent a first object (201) covering at least a predefined portion of a total image area (A) registrable by the imaging system (110) through the front window (111), which first object (201) moves (M) and/or is positioned relative to the front window (111) in a way deemed to cause dirt (D) to be removed therefrom;

image data ($D_{img}$) estimated to represent a second object (202) located within a distance range ($d_R$) from the front window (111), which second object (202) moves (M) and/or is positioned relative to the front window (111) in a way deemed to cause dirt (D) to be removed therefrom;

image data ($D_{img}$) designating an intensity of light which is estimated to be reflected from a third object that moves (M) and/or is positioned relative to the front window (111) in a way deemed to cause dirt (D) to be removed therefrom; and image data ($D_{img}$) estimated to represent a fourth object (204) having a shape that matches an outline of a predefined cleaning tool to a degree above a threshold matching level, which fourth object (204) moves (M) and/or is positioned relative to the front window (111) in a way deemed to cause dirt (D) to be removed therefrom.

2. The system according to claim 1, wherein the control unit (120) is configured to determine that the cleaning action is performed based on a confidence measure indicating a reliability of the image data ($D_{img}$).

3. The system according to claim 1, wherein the control unit is configured to analyze the obtained image data ($D_{img}$) by executing an image processing algorithm adapted to detect an amount of dirt on the front window (111).

4. The system according to claim 3, wherein the control unit is further configured to:

execute the image processing algorithm at first and second points in time, the second point in time being later than the first point in time; and if the image processing algorithm detects that the amount of dirt on the front window (111) is lower at the second point in time than at the first point in time, cause the second point in time to be recorded in the digital storage unit (130) as a point in time when the cleaning action was performed.

5. The system according to claim 1, wherein the control unit (120) is further configured to determine that the cleaning action is performed based on a duration of a period during which at least one of the first, second, third and fourth objects (201, 202, 204) is located within a view range of the imaging system (110).

6. The system according to claim 1, wherein, the control unit (120) is configured to:

obtain, from the digital storage unit (130), a series of recorded points in time ($\{t_1, t_2, t_3, t_4\}$) for the cleaning action; and generate a report (R) based on said series of recorded points in time ($\{t_1, t_2, t_3, t_4\}$), which report (R) describes cleaning activity performed to remove dirt (D) from the front window (111) of the imaging system (110).

7. The system according to claim 6, wherein the control unit (120) is further configured to forward the report (R) to a display unit for presentation of the report (R) together with information reflecting a performance of said installation.

8. The system according to claim 7, wherein the performance reflects at least a number of animals (100) served by said installation per unit of time during at least one period in relation to at least one point in time in said series of recorded points in time ($\{t_1, t_2, t_3, t_4\}$).

9. A computer-implemented method of quality assuring image data of an installation arranged to perform at least one action relating to an animal (100), the method comprising:

providing a system to perform automatic cleaning of a front window of an imaging system on a schedule;

obtaining image data ($D_{img}$) having been registered by the imaging system (110) of said installation when the installation is in an idle mode;

analyzing the obtained image data ($D_{img}$) to determine if a cleaning action to remove dirt (D) from the front window (111) of the imaging system (110) has been performed manually, outside of the automatic cleanings on the schedule; and if it is determined that such a cleaning action has been performed manually, causing a point in time ($t_i$, $t_1$, $t_2$, $t_3$, $t_4$) for the manual cleaning action to be recorded in a digital storage unit (130), wherein the determining that the cleaning action is performed based on at least one of:

image data ($D_{img}$) estimated to represent a first object (201) covering at least a predefined portion of a total image area (A) registrable by the imaging system (110) through the front window (111), which first object (201) moves (M) and/or is positioned relative to the front window (111) in a way deemed to cause dirt (D) to be removed therefrom;

image data ($D_{img}$) estimated to represent a second object (202) located within a distance range ($d_R$) from the front window (111), which second object (202) moves (M) and/or is positioned relative to the front window (111) in a way deemed to cause dirt (D) to be removed therefrom;

image data ($D_{img}$) designating an intensity of light which is estimated to be reflected from a third object that moves (M) and/or is positioned relative to the front window (111) in a way deemed to cause dirt (D) to be removed therefrom; and image data ($D_{img}$) estimated to represent a fourth object (204) having a shape that matches an outline of a predefined cleaning tool to a degree above a threshold matching level, which fourth object (204) moves (M) and/or is positioned relative to the front window (111) in a way deemed to cause dirt (D) to be removed therefrom.

10. The method according to claim 9, wherein the determining that the cleaning action is performed based on a confidence measure indicating a reliability of the image data ($D_{img}$).

11. The method according to claim 9, wherein the analyzing of the obtained image data ($D_{img}$) involves executing an image processing algorithm adapted to detect an amount of dirt on the front window (111).

12. The method according to claim 11, wherein the method comprises:

executing the image processing algorithm at first and second points in time, the second point in time being later than the first point in time; and if the image processing algorithm detects that the amount of dirt on the front window (111) is lower at the second point in time than at the first point in time, causing the second point in time to be recorded in the digital storage unit (130) as a point in time when the cleaning action was performed.

13. The method according to claim 9, further comprising determining that the cleaning action is performed based on a duration of a period during which at least one of the first, second, third and fourth objects (201, 202, 204) is located within a view range of the imaging system (110).

14. The method according to claim 9, further comprising:

obtaining, from the digital storage unit (130), a series of recorded points in time ($\{t_1, t_2, t_3, t_4\}$) for the cleaning action; and generating a report (R) based on said series of recorded points in time ($\{t_1, t_2, t_3, t_4\}$), which report (R) describes manual cleaning activity performed to remove dirt (D) from the front window (111) of the imaging system (110).

15. The method according to claim 14, further comprising:

forwarding the report (R) to a display unit for presentation of the report (R) together with information reflecting a performance of said installation.

16. The method according to claim 15, wherein the performance reflects at least a number of animals (100) served by said installation per unit of time during at least one period in relation to at least one point in time in said series of recorded points in time ($\{t_1, t_2, t_3, t_4\}$).

17. A non-transitory computer-readable medium on which is stored a computer program (627), the computer-readable medium being (626) communicatively connected to a processing unit (625), the computer program (627) comprising software that performs the method according to claim 9 when the computer program is run on the processing unit (325).

\* \* \* \* \*